US008316739B2

(12) United States Patent
Vollmuth et al.

(10) Patent No.: US 8,316,739 B2
(45) Date of Patent: Nov. 27, 2012

(54) SCREWDRIVING SYSTEM WITH VARIABLY ADJUSTABLE SCREWDRIVING SPINDLES

(75) Inventors: Michael Vollmuth, Muehlheim am Main (DE); Klaus Oehme, Gaildorf (DE)

(73) Assignee: Robert Bosch GmbH, Stuttgart (DE)

( * ) Notice: Subject to any disclaimer, the term of this patent is extended or adjusted under 35 U.S.C. 154(b) by 560 days.

(21) Appl. No.: 12/296,214

(22) PCT Filed: Feb. 22, 2007

(86) PCT No.: PCT/EP2007/001517
§ 371 (c)(1),
(2), (4) Date: Mar. 17, 2010

(87) PCT Pub. No.: WO2007/118544
PCT Pub. Date: Oct. 25, 2007

(65) Prior Publication Data
US 2010/0162854 A1   Jul. 1, 2010

(30) Foreign Application Priority Data
Apr. 12, 2006   (DE) .......................... 10 2006 017 653

(51) Int. Cl.
*B25B 21/00*   (2006.01)
*B25B 17/00*   (2006.01)

(52) U.S. Cl. ...................... 81/57.22; 81/57.14; 81/57.36

(58) Field of Classification Search .................. 81/57.22, 81/57.36, 57.14, 57.3, 57.31; 29/525.11
See application file for complete search history.

(56) References Cited

U.S. PATENT DOCUMENTS

| 2,069,882 A | | 2/1937 | Hall | |
|---|---|---|---|---|
| 2,807,972 A | * | 10/1957 | Mitchell | 81/57.36 |
| 2,964,152 A | | 12/1960 | Banner | |
| 3,319,494 A | | 5/1967 | Ulbing | |
| 3,439,754 A | | 4/1969 | Pantel | |
| 3,757,613 A | | 9/1973 | Arndt et al. | |
| 4,542,576 A | * | 9/1985 | Yamanaga et al. | 483/32 |
| 4,909,105 A | * | 3/1990 | Namiki et al. | 81/57.36 |
| 5,277,085 A | * | 1/1994 | Tanimura et al. | 81/57.22 |
| 6,134,989 A | * | 10/2000 | Stevens | 81/57.22 |
| 6,189,418 B1 | * | 2/2001 | Sloan et al. | 81/57.36 |
| 2006/0169107 A1 | * | 8/2006 | Taniguchi et al. | 81/57.22 |

FOREIGN PATENT DOCUMENTS

| DE | 944 930 | 6/1956 |
|---|---|---|
| DE | 1 603 925 | 1/1971 |
| DE | 2 112 907 | 9/1972 |
| DE | 80 09 762 | 3/1981 |
| DE | 34 34 850 | 2/1985 |
| DE | 249 219 | 9/1987 |
| DE | 200 22 490 | 1/2002 |

(Continued)

*Primary Examiner* — David B Thomas
(74) *Attorney, Agent, or Firm* — Michael J. Striker

(57) ABSTRACT

A method for attaching a plurality of fasteners located along a circular path uses a screwdriving device that has feed drive outputs. The drive outputs correspond to the fasteners, are located on a circular path and include a screwdriving tool bit. During the method, the drive outputs are extended from a position of repose to a working position and the screwdriving tool bit, located at the fastener, screws in the fastener. The feed drive outputs are located on circular paths of different diameters and only those drive outputs located on a particular circular path, which corresponds with a circular path on which the fasteners are located, leave their position of repose. The number of feed drive outputs corresponds to the number of fasteners.

13 Claims, 2 Drawing Sheets

FOREIGN PATENT DOCUMENTS

| | | |
|---|---|---|
| DE | 20 2005 012 869 | 12/2005 |
| EP | 0 203 370 | 12/1986 |
| EP | 0 544 102 | 6/1993 |
| JP | 61-65731 | 4/1986 |
| JP | 8-197347 | 8/1996 |
| JP | 8-197440 | 8/1996 |
| JP | 2005-246515 | 9/2005 |

* cited by examiner

SCREWDRIVING SYSTEM WITH VARIABLY ADJUSTABLE SCREWDRIVING SPINDLES

BACKGROUND OF THE INVENTION

The invention relates to a method for screwing in a plurality of fastening means, such as screws and nuts, and to a device for performing the method.

In Published European Patent Application EP 0203 370 A1, a screwdriving device with a motor-driven screwdriver is shown. If many identical fastening means, located in accordance with a fixed geometric shape, such as screws/nuts for securing a wheel rim, are to be screwed in as fast as possible, then using the aforementioned screwdriving device entails relatively major effort, since the screwdriving device has to be manually realigned and positioned for each screw/nut combination.

SUMMARY OF THE INVENTION

The object of the invention is to screw a group of a plurality of fastening means into a workpiece simultaneously and with the least possible effort.

The object is attained by means of a method for attaching a plurality of fastening means, in particular located along a circular path, using a screwdriving device having feed drive outputs, corresponding to the fastening means and in particular located on a circular path and including a screwdriving tool bit, wherein the following method steps are included: Extending the drive outputs from a position of repose to a working position; locating the screwdriving tool bit at the fastening means; and screwing the fastening means in by means of the drive outputs.

Depending on the workpiece variant, fastening means in the forms of screws/nuts with an identical or different wrench width or another shape can occur.

This method has the advantage that the screwdriving system can be mounted on a stationary or variable device, and the screwing operation can be performed in automated fashion. Because of the corresponding location of fastening means and screwdriving devices, many geometrically located, identical or different fastening means, as is usual for instance in fastening wheel rims to motor vehicles, can be screwed into a workpiece simultaneously and thus in a time-saving way. It is also advantageous that different screws or nuts can be screwed in, since the drive outputs can also have different tool bits, such as bits for different wrench widths, or different recess. The number of drives required is reduced; less work space is needed, and there are savings in weight and expense.

Preferably, after the conclusion of the screwdriving operation, the drive outputs return to the position of repose, and as a result the work space can be optimally utilized.

Especially preferably, the screwdriving device includes feed drive outputs, which are located on circular paths of different diameters, and it is always only those drive outputs which are located on the particular circular path which in turn corresponds with a circular path on which the fastening means are located that leave their position of repose, and wherein the number of feed drive outputs corresponds to the number of fastening means.

This accordingly makes the method enormously flexible, because products of the most various dimensions can be handled within one and the same production line, without having to adapt the screwdriving device.

Quite particularly preferably, the fastening means are screw/nut combinations for fastening wheel rims to motor vehicles. These screw/nut combinations are as a rule located inside a pitch circle diameter, so that the rims can be fastened to the motor vehicle without torsion. The method now makes it possible for all the screw/nut combinations to be screwed on simultaneously, with the identical torque. Rims for different vehicle models and engine capacities can be mounted in a time-saving way, without interrupting the work process and without refitting.

The object is also attained by means of a device for attaching fastening means, including a plurality of spindle drives for driving a plurality of feed drive outputs, in particular located on circular paths of different diameters, with tool bits.

The same advantages are attained as already mentioned above. Moreover, a compact, lightweight multiple screwdriving system can be implemented.

Preferably, means are provided that enable the operation of two feed drive outputs by means of a single common spindle drive. The means may be included in a block drive output, which represents the drive output of the entire embodiment by combining all the drive outputs. Then only half the number of spindle drives is needed; for instance, for System 5 perforated rims with 2 pitch diameters, only five spindle drives rather than ten are needed. Also, this system is more compact in structure, compared to a system that likewise uses only five spindles but works with an electromechanical pitch circle diameter adjustment.

Preferably, the device includes a first group of a plurality of feed drive outputs, in particular five, of feed drive outputs and a second group of a plurality of feed drive outputs, in particular five, each located on a different circular path; the radii of the circular paths differ, and one spindle drive is provided for driving two feed drive outputs each over different circular paths. This saves both expense and space, since drive outputs directly adjacent each other use the same spindle drive.

Especially preferably, the device includes a feed drive output, which is implemented by means of a pneumatically, hydraulically or electrically operated actuator in the form of a cylinder, whose piston rod is embodied as a shaft with a tool bit receptacle. This makes it possible to implement a position of repose and a work position for implementing a robot-guided screwdriving operation, for instance.

Alternatively, it is also possible, by means of a nut supported in friction-locking fashion, with a ball roll or threaded spindle driven by a screwdriving spindle, to achieve a motion between a state of repose and a work position. Because of the supported nut that is fixed only by friction-locking, further rotation for fastening the fastening means can be achieved. The position of repose is reached by reversing the direction of rotation. The rotation of the screwdriving spindle is prevented by fastening it to a linear guide.

Both methods contribute to enabling optimal utilization of the work space.

Different screw assemblies, such as screw/nut combinations, that are located on circles of different radii can be screwed in by means of one and the same screwdriving device, because the drive outputs required for a particular screw assembly are moved from the position of repose to the work position, and the drive outputs no longer needed are moved from the work position to the position of repose.

Quite particularly preferably, the spindle drives have an electric motor, and the motor drives the shaft of the feed drive output by means of a gear, such as a planetary gear. Thus torques and speed changes can be implemented as needed.

Preferably, the gear comprises a plurality of gear wheels; a first gear wheel is located on the spindle of the spindle drive and transmits the spindle rotation to a second gear wheel, and this second gear wheel transmits the rotation to a third gear wheel, which is located on the shaft. As a result, the desired direction of rotation can be configured as needed. It is also possible to use more than three gear wheels for further configurations, and transmission by means of a chain drive or toothed belt drive is equally conceivable.

Preferably, the motions of the shaft and/or the torque is detected by means of a measured value transducer. With a suitable controller, the course of screwing in can be made exact and user-friendly. It is equally possible for the quality of the screwdriving operation and the work sequences, for instance, to be documented.

If the screwdriving system is used for installing wheel rims or other vehicle components of the same or different dimensions, then with the same screwdriving system, wheel rims of different pitch circle diameters and with different tool bits or tool bit shapes can be screwed on. This saves both production costs and material costs, especially if the device of the invention is used for equipping motor vehicles with wheel rims, and the device is in particular included in a motor vehicle production line.

LIST OF REFERENCE NUMERALS

| | |
|---|---|
| 11 | Spindle drive |
| 12 | Gear |
| 13 | Cylinder |
| 14 | Piston |
| 15 | spline shaft |
| 16 | compressed-air connection |
| 17 | drive output |
| 18 | tool bit receptacle |
| 19 | feed drive output |
| 20 | Double feed drive output |
| 21 | screwdriving tool bit |
| 22 | Block drive output with gears |

DETAILED DESCRIPTION OF THE INVENTION

Figure 1:
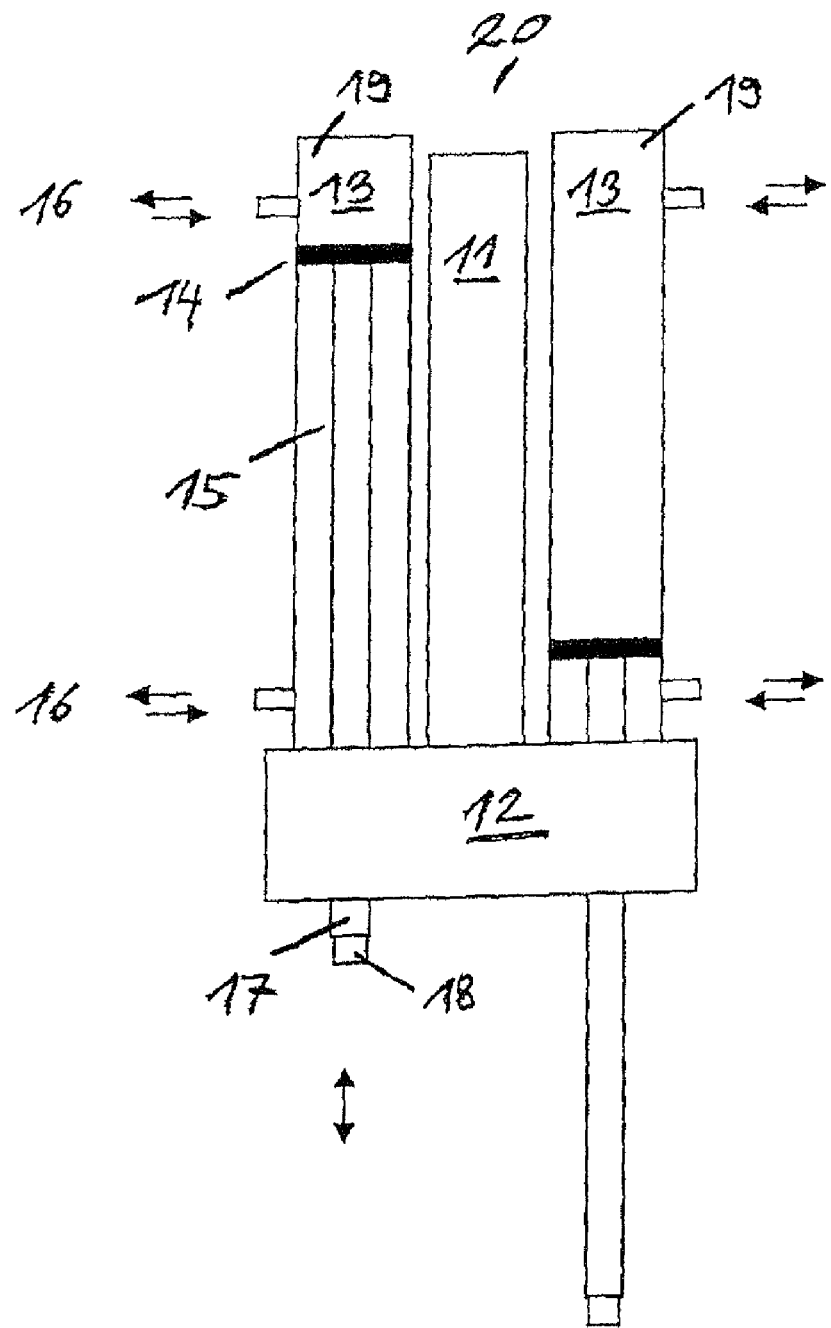
FIG. 1 shows a double feed drive output 20, which represents a part of the screwdriving device according to the invention of the method of the invention.

The double feed drive output 20 shown in FIG. 1 includes a spindle drive 11, a gear 12, and two feed drive outputs 19, each with one cylinder 13, one piston 14, one spline shaft 15, two compressed-air connections 16, and one drive output 17 with a tool bit receptacle 18.

By means of the gear 12, a spindle drive 11 drives the spline shafts 15 of each of the two feed drive outputs 19, which are additionally axially displaceable by means of the piston 14 inside the cylinder 13 in the direction of the axis of rotation of a spline shaft 15. The feed is implemented by means of compressed air, because the emergence of the spline shaft 15 from the cylinder is implemented by means of a first compressed-air connection 16 (FIG. 1, top), and the retraction of the spline shaft into the cylinder is implemented by means of a second compressed-air connection 16 (FIG. 1, bottom). A hydraulically or electrically operated cylinder (for instance with a revolving ball spindle) would also be conceivable.

It is clearly visible from FIG. 1 that one of the drive outputs 19 is extended into a work position (on the right in the drawing), and a further drive output is located in the position of repose (on the left in the drawing). If a plurality of these double feed drive outputs, for instance five of them (each comprising two feed drive outputs 19 and one spindle drive 11), are arranged circularly, then the screwdriving device of the invention is obtained; thus 2×5 feed drive outputs 19 are located circularly, and because of the spacing of the feed drive outputs 19, the two circles have different radii. It is thus possible to implement a screwdriving device which is suitable for installing wheel rims of different pitch circle diameters.

Figure 2:
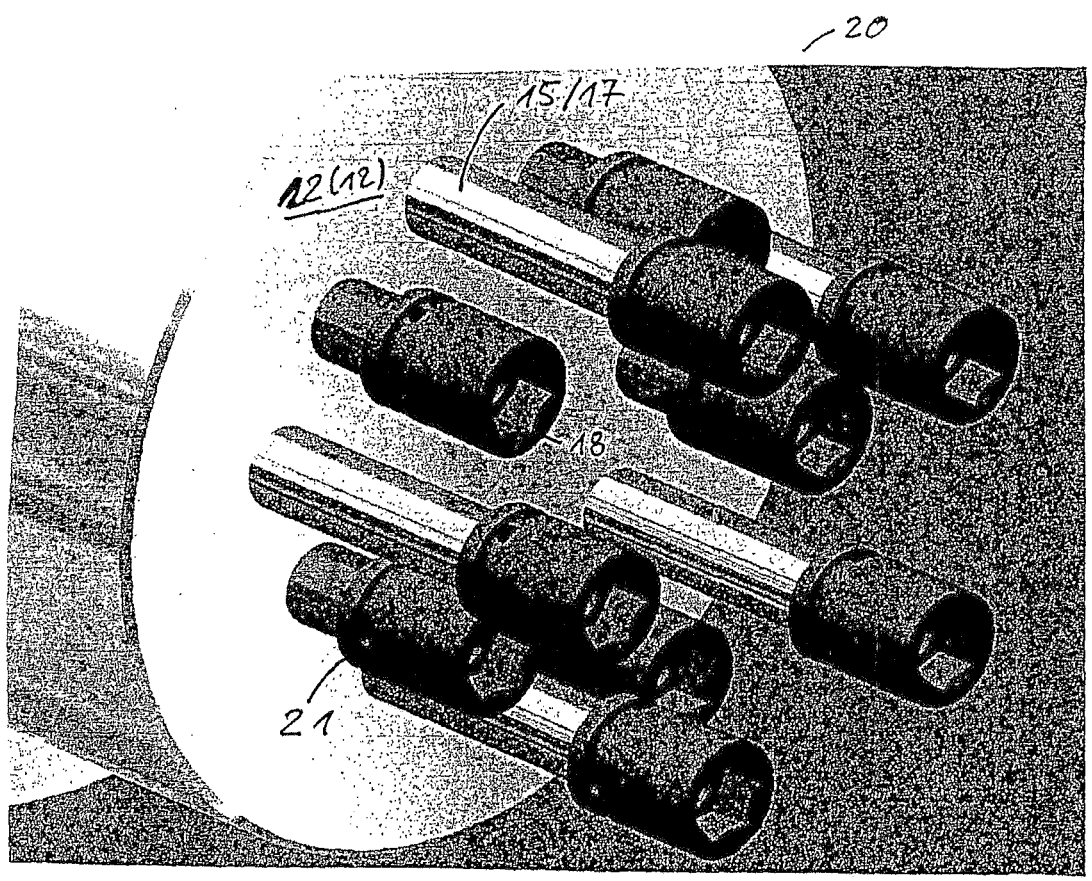
FIG. 2 shows a device according to the invention in perspective on the tool bit end.

From FIG. 2, it can be seen that the device according to the invention includes five drive outputs 17, each with one screwdriving tool bit (nut 21), which are located on an outer circular circumference, as well as five drive outputs 17 each with a screwdriving tool bit (nut 21) which are located on an inner circular circumference; the radius of the inner circle is slightly smaller than that of the outer circle. The drive outputs 17 located on the outer circle are in their work position (extended spline shaft 17, while the drive outputs located on the inner circle are in their position of repose (retracted spline shaft 17). In their position of repose as well, the spline shafts 15 of the feed drive outputs protrude from the gearbox (the spindle drives and feed drive outputs are not shown). The block drive 22 includes the gear for triggering the spline shafts 17.

What is claimed is:

1. A method for attaching a plurality of fastening means, located along a circular path, using a screwdriving device (20) having feed drive outputs (19, 17), corresponding to the fastening means, located on a circular path and including a screwdriving tool bit (18), the method comprising the steps of:
    extending the drive outputs (17) from a position of repose to a working position and locating the screwdriving tool bit (18) at the fastening means, and
    screwing the fastening means in by the drive outputs (17), wherein the feed drive outputs (19) are located on circular paths of different diameters and only those drive outputs (17) located on a particular circular path, which corresponds with a circular path on which the fastening means are located, leave a position of repose,
    wherein the number of feed drive outputs (19) corresponds to the number of fastening means, and
    wherein two feed drive outputs (19) are operated by a common spindle drive 11 using means (12).

2. The method as defined by claim 1, wherein the drive outputs (17) return to the position of repose again after the conclusion of the screwdriving operation.

3. The method as defined by claim 1, wherein the fastening means are screws or nuts for fastening objects such as wheel rims, gear wheels, ring gears, flywheels, brake disks, and wheel sets to a body, engine or transmission of a motor vehicle.

4. A device for attaching fastening means, comprising:
    a plurality of spindle drives (11) for driving a plurality of feed drive outputs (17, 19), which include screwdriving tool bits (18) and which are, located on circular paths of different diameters;
    means (12) for enabling operation of two feed drive outputs (19) using one common spindle drive (11);
    wherein the number of feed drive outputs (17) corresponds to the number of fastening means and only those drive outputs (17) located on a particular circular path which corresponds to a circular path upon which the fastening means are located operate to leave a position of repose to effect screwing in of the fastening means.

5. The device as defined by claim 4, wherein a first group of a plurality of feed drive outputs (19) is located on a first circular path, and a second group of a plurality of feed drive outputs (19) is located on a second circular path; wherein radii of the circular paths differ; and wherein one spindle drive (11) is provided for driving two feed drive outputs (19) each over different circular paths.

6. The device as defined by claim 4, wherein a feed drive output (19) is implemented using a pneumatically, hydraulically or electrically operated actuator in the form of a cylinder (3), whose piston rod is embodied as a shaft (5) with a tool bit receptacle (8).

7. The device as defined by claim 6, wherein the spindle drive (11) includes an electric motor; wherein the electric motor drives the shaft (5) of the feed drive output (19) by use of means 12 and wherein means (12) comprises a gear.

8. The device as defined by claim 7, wherein the gear (12) comprises a plurality of gear wheels; wherein a first gear wheel is located on the spindle of the spindle drive (11) and transmits the spindle rotation to a second gear wheel, and wherein the second gear wheel transmits the rotation to a third gear wheel, which is located on the shaft (5).

9. The device as defined by claim 7, wherein the gear (12) comprises chains or toothed belts, in order to transmit a torque.

10. The device as defined by claim 6, wherein each spindle of a spindle drive (11) is brought into engagement using an electrical or pneumatic clutch.

11. The device as defined by claim 4, further comprising a measured value transducer for detecting motions of the shaft, the torque (5) or both.

12. The device as defined by claim 4, wherein the fastening means are used for assembling motor vehicle components.

13. The device as defined by claim 4, wherein the objects fastened by the fastening means are any of the group consisting of: wheel rims, gear wheels, ring gears, flywheels, brake disks, and wheel sets for motor vehicles or motor vehicle components, including a screwdriving device as defined by claim 5, and wherein the device is included in a motor vehicle production line.

* * * * *